Figure 1:
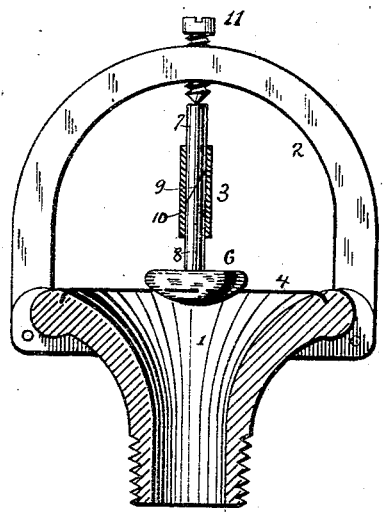

(No Model.)

F. GRINNELL.
AUTOMATIC FIRE EXTINGUISHER.

No. 431,971. Patented July 8, 1890.

Attest:
C. L. Haynes
N. F. Hayes

Inventor:
Frederick Grinnell
by Bradley & Knight
Attys

UNITED STATES PATENT OFFICE.

FREDERICK GRINNELL, OF PROVIDENCE, RHODE ISLAND.

AUTOMATIC FIRE-EXTINGUISHER.

SPECIFICATION forming part of Letters Patent No. 431,971, dated July 8, 1890.

Application filed February 10, 1890. Serial No. 339,805. (No model.)

*To all whom it may concern:*

Be it known that I, FREDERICK GRINNELL, of Providence, in the county of Providence and State of Rhode Island, have invented a certain new and useful Improvement in Automatic Fire-Extinguishers, of which the following is a specification.

My invention relates to automatic fire-extinguishers provided with an outlet closed by a valve held to its seat by a fusible joint or other heat-actuated device, so that at a predetermined temperature the valve is released and allows the water to discharge and extinguish the fire. In systems of this kind the "sprinkler-valve," as it is termed, is the most important factor and presents a difficult mechanical problem that has only been imperfectly solved up to the present time. It must be borne in mind that a perfect valve for this service must be left without care and attention for many years, and often in most unfavorable locations. It is exposed on the outside to the action of the elements and to corrosive gases and other deleterious substances employed in the various factories where this sprinkler system is in use, while on the inside there are deposits from the contained water often in several layers, as the pipes are successively charged and discharged, and impurities in the water act to corrode and choke the valve. In spite of all such severe conditions it is necessary that the valve open promptly, completely, and surely at any moment of the long period whenever the restraining device is released by the heat of the fire, and a failure to act on such occasion may cause untold damage, while on the other hand it is equally necessary that it act at no other time and cause nearly equal injury by leakage. As a matter of fact, all valves heretofore constructed (and a great number have been tried) have been more or less unreliable and imperfect, liable to leak, and not opening when required, sometimes on account of the heat passing too rapidly from the soldered joint to the pipe system or the water therein, sometimes on account of the sticking of the valve, and often on account of both causes combined. While required to be practically permanent and indestructible, they become often so corroded and clogged that they refuse to open under the air or water pressure even after the heat-actuated device has operated. The infinitesimal leak that occurs when the corrosion has eaten through the joint allows by its slow evaporation the formation of an adherent cement that effectually seals the valve to its seat. Even when a metal or alloy is used that will be proof against destruction by corrosion there is always enough surface corrosion to render the valve liable to stick.

It has been found, moreover, that all kinds of rubber or fibrous packing are destroyed, while with soft metals—such as lead—or a valve of metal and a seat of rubber, or vice versa, the soft member becomes indented and sticks so closely as to fail to operate at the required moment, especially when sufficient pressure has been applied to prevent leakage under the changing external and internal conditions to which the valve is subject. To overcome these difficulties many different devices have heretofore been employed. In some cases the valve and its seat have been made of metals which have the least tendency to corrode and stick together. It has also been proposed to cover the valve with a fusible protecting material, like paraffine, and others have inclosed it in a frail protecting-case, and still others have reduced the area of contact to a knife-edge, which avoided some troubles, but increased the indenture of the parts. Gaskets of various materials and thin metal facings on softer metals have also been used. It is sufficient to say that all of these are unsatisfactory. My invention overcomes these difficulties in the simplest manner possible by a device never before employed by the many inventors who have endeavored to solve the problem.

It consists in making the valve or valve-seat, or both, of glass or a similar non-metallic mineral substance having the essential qualities of non-conductivity, hardness, smoothness, and non-corrodibility. Thus I may employ other silicious substances—such as porcelain or vitrified clays, or even marble or other polished stone—or the body of the valve or valve-seat may be of metal and an enameled surface applied to it. Therefore, while I describe and claim my invention as an automatic fire-extinguisher having a valve or valve-seat, or both, made of glass or similar material, I desire it to be definitely understood that I do not limit myself to that particular substance; but being the first inventor of an automatic fire-extinguisher having valves of this nature, I intend to embrace by the term "glass" all equivalent materials having the essential qualities of non-conductivity, non-corrodibility, hardness, and smoothness.

The following specification discloses the best form in which I contemplate applying my invention, and also sets forth important details of construction.

My invention is illustrated in the accompanying drawings, in which—

Figure 2:
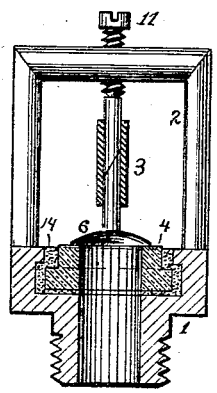
Figure 3:
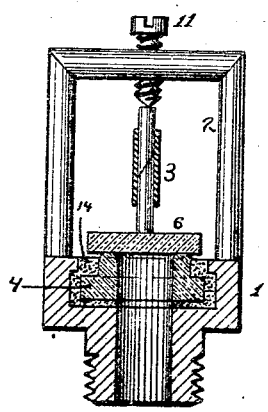

Figure 1 shows a glass valve with a metallic seat. Fig. 2 shows a metallic valve with a glass seat, and Fig. 3 shows a glass valve with a glass seat. These three figures all illustrate the generic invention and show its scope, and while in this application I intend to claim the invention broadly, and also to claim the specific form shown in Fig. 1, I have filed herewith another application, in which I have claimed specifically the form shown in Fig. 2.

I will first describe the form shown in Fig. 1. I have discovered that a button of glass with its natural fire-glaze and without artificial polishing will, when pressed to a flexible metallic seat, make a perfectly air and water tight joint, notwithstanding the fact that the surface of the glass is not geometrically true. I therefore use a button of glass having a spherical or rounded surface pressed into a central orifice in a flexible diaphragm of thin sheet metal. I prefer to use a valve having a rounded surface, as it is more securely held in place, and, moreover, presents an oblique bearing-surface to the valve-seat, so that only a narrow edge of the latter bears against it. It will be understood that there is an advantage in having the bearing-edge as narrow as possible, providing the surface against which it rests is hard enough not to be indented by it.

Referring to the drawings, the base 1 of the sprinkler may be of any desired form, and it may support an arch 2 for the purpose of forming an abutment for the valve-holding device 3. The valve-seat 4, which I have shown secured in the base in the usual way, is made of resilient sheet metal in the form of a flat annulus. The edge of the orifice against which the valve rests may be either slightly turned up or left flat, as shown. The glass valve 6 is preferably of the form shown and it is held against its seat by a compound strut 3, consisting of two pieces 7 and 8, having oblique meeting surfaces secured together with fusible solder at 9, the two pieces being further held from moving on each other by a sleeve of hard metal 10, made in halves and secured together by fusible solder. An adjustable screw 11 may be used to set the valve in its seat with the required amount of pressure.

The flexibility of the thin metal valve-seat allows it to conform to the irregularities in the contour of the glass, thereby making a perfectly air-tight joint. This flexibility is especially necessary when the glass is used with its natural glaze, which is the way I prefer to use it. In such case the glass has a very smooth glazed surface that foreign matter will not adhere to, although it lacks the precision of geometrical contour that an artificial grinding would give. The contour of the valve, though not geometrically perfect, has no abrupt irregularities, and the thin flexible valve-seat easily bends, so as to conform to the valve-surface.

Fig. 2 shows another form in which my invention may be applied. In this case the valve-seat 4 is made of glass and the valve 6 of flexible sheet metal. The glass valve-seat may be secured to the base 1 in any suitable manner. I have shown it cemented into a seat in the base by plaster-of-paris or other cement 14. The flexible valve may be slightly "dished," as shown, so as to give it just sufficient stiffness and also in order that it may bear on the glass valve-seat at its edges only. The glass valve-seat may be a flat annular ring cut from a sheet of window-glass or molded or blown in any suitable manner. Owing to the flexibility of the valve, the natural surface of the glass need not be improved or corrected by grinding or other process, as the valve will bend to conform to the surface of the valve-seat, notwithstanding slight irregularities in the latter's contour.

Fig. 3 shows still another form in which the broad invention may be applied. In this instance both the valve and its seat are of glass and both the valve and its seat are preferably ground and polished, so as to make a tight joint. The devices for holding the valves in place in the form in Figs. 2 and 3 are the same as in the form in Fig. 1.

The advantage in the use of glass for the valve or its seat, or both, by virtue of which it overcomes the difficulties above described, is quite obvious. It is a good heat-insulator, and will prevent the too rapid escape of heat from the soldered joint; it will never be attacked by acids, alkalies, gases, and other corrosives, thereby avoiding the adhesion that would otherwise occur at the joint; it cannot become indented and stick, while the joint can be made tight and reliable; foreign substances will not adhere to it, and while it is of course brittle and fragile it is so employed in my construction that no strain is given to it. It will be understood from the foregoing that the main advantages in the use of glass appertain to the nature of the surface of the glass. A valve of this material is perfectly sensitive however long and in whatever locations it may be left, and at the same time forms a valve that can be held tight enough to withstand any sudden impact of the water from within—as, for instance, when the pipes are suddenly charged or a section suddenly cut off and the water backs up with a ramming effect against the valves in the rest of the system.

An advantage deserving especial notice is that the glass is a comparatively poor conductor of heat, and the heat-actuated device is insulated by it from the connected mass of pipes and water, which would tend to delay its melting. The heat-actuated device is thus more likely to respond quickly to an abnormal increase of temperature. This feature is of particular value when the heat-actuated device forms a part of the strut that holds the valve.

What I claim as new, and desire to secure by Letters Patent, is—

1. In an automatic fire-extinguisher organized to release a valve by thermal action at a predetermined temperature, the combination of the heat-actuated device, which normally holds the valve to its seat, with a valve formed of vitreous substance or equivalent hard and smooth heat-insulating material, substantially as described.

2. In an automatic fire-extinguisher of the character above described, a heat-actuated device normally holding the valve to its seat insulated from normal heat conductivity by vitreous bearings, substantially as described.

FREDERICK GRINNELL.

Witnesses:
EDWIN P. ALLEN,
W. L. PHILLIPS.